United States Patent Office 3,151,128
Patented Sept. 29, 1964

3,151,128
HYDROXY-GAMMA-LACTONES AND
PROCESS THEREFOR
Guido Lardelli, Birsfelden, near Basel, Switzerland, and
Pauline Haverkamp Begemann, Dordrecht, and Pieter
Daniel Harkes and Anthonie Simon Maria van der
Zijden, Vlaardingen, Netherlands, assignors to Lever
Brothers Company, New York, N.Y., a corporation of
Maine
No Drawing. Filed June 12, 1962, Ser. No. 208,167
3 Claims. (Cl. 260—343.6)

This invention relates to a new class of hydroxy-gamma-lactones and to methods of preparing these compounds.

This is a continuation-in-part of application Serial No. 755,376, filed August 18, 1958, now U.S. Patent 3,075,998.

The new compounds of the invention which for brevity will be termed lactonols have the general formula:

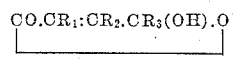

in which $R_1$ and $R_2$ are hydrogen or branched-chain or straight-chain alkyl radicals containing from one to five carbon atoms, at least one of them being such an alkyl radical, and $R_3$ is a hydrocarbon radical selected from the group consisting of alkyl, alkylene, cycloalkyl, cycloalkylalkyl, aralkyl and aralkylene groups having 2 to 9 carbon atoms. Thus $R_3$ may be for example —$CH_2.CH_3$, —$CH_2.CH_2.CH_3$, —$CH_2.(CH_2)_2.CH_3$,
—$CH_2.(CH_2)_3.CH_3$, —$CH_2.(CH_2)_4.CH_3$,
—$CH_2.(CH_2)_5.CH_3$, —$CH(CH_3).CH_2.CH_3$,
—$CH.(CH_2.CH_3)_2$, —$CH_2.CH_2.CH(CH_3)_2$,

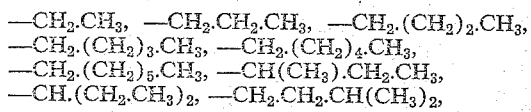

—$CH_2.CH:CH.CH_3$, —$CH_2.C_6H_5$, —$CH_2.CH_2.C_6H_5$,
or
—$CH_2.CH:CH.C_6H_5$

A preferred class of lactonols according to the invention is the class of 5-alkyl-5-hydroxy-3,4-dimethyl-2,5-dihydro-furane-2-ones in which the 5-alkyl radical has 4 to 7 carbon atoms. Also of importance are the corresponding 3,4-diethyl and 3,4-dibutyl homologues and the 5-alkyl-5 - hydroxy - 3,4 - dimethyl - 2,5 - dihydrofurane-2-ones in which the 5-alkyl radical is a branched radical having 5 carbon atoms and the corresponding compounds in which the 5-alkyl radical is replaced by an aralkyl radical having 7 to 8 carbon atoms.

An important use of the lactonols of the invention is in the preparation (by dehydration) of lactones of the formula:

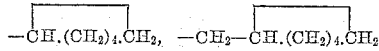

where $R_1$ and $R_2$ are as defined above and $R_4$ is a radical differing from $R_3$ only in that it contains one hydrogen atom less on the first carbon atom being attached to the ring by a double bond. These lactones and their preparation are claimed in copending application Serial Number 755,376 filed August 18, 1958, now U.S. Patent 3,075,998.

The lactonols of the present invention may be prepared by the following methods:

(a) The appropriate alkyl-substituted maleic anhydride is reacted with the appropriate Grignard reagent $R_3MgX$, where $R_3$ is as defined above and X is a halogen atom. For example:

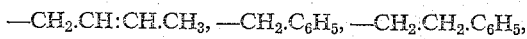

where $R_1$, $R_2$ and $R_3$ are as defined above, and the addition compound is hydrolysed to convert the —OMgCl group to an —OH group.

The reaction has to be carried out at low temperatures (—95 to +5° C. and preferably —70 to —90° C.) in order to avoid the reaction of the addition compound with further molecules of the Grignard reagent.

(b) The alkyl-substituted maleic anhydride is reacted with an organo-zinc-halide, $R_3ZnX$, or an organo-cadmium compound of the formula $R_3CdR_3$ ($R_3$ being as defined above), and the resulting addition product is hydrolysed to convert the organo-metallic group to an —OH group. The reaction between the alkyl maleic anhydride and the zinc alkyl halide or dialkyl cadmium may be carried out at temperatures between 70 and 90° C., preferably about 80° C.

The alkyl-substituted maleic anhydrides described above may be prepared by the following methods:

(a) A beta-keto-carboxylic acid ester $R_1.CO.CH_2.CO.OR$ is reacted with sodium and an alkyl halide $R_2X$, to form the alpha-alkyl derivative which is then treated with sodium cyanide and hydrochloric acid to form the cyanohydrin $R_1C(OH)(CN).CHR_2).CO.OR$ and this is then hydrolysed and dehydrated to remove two molecules of water from the resulting hydroxy acid $R_1.C(OH)(CO.OH).CH(R_2).CO.OH$ (b) A chloroketone of the formula $R(.CO.CH(R_2)Cl$ is treated with sodium cyanide, the resulting cyano compound $R_1.CO.CH(R_2).CN$ is treated with hydrocyanic acid in the presence of acetic anhydride to form the dicyano acetic ester $CH_3.CO.O.C(R_1)(CN).CH(R_2).CN$ which is then hydrolysed and dehydrated to form the alkyl-substituted anhydride desired.

(c) An alpha-bromo carboxylic acid ester $Br.CH(R_1).CO.OR$ is reacted with a beta-keto carboxylic ester, $R'_2.CO.CH_2.CO.OR$ where $R'_2$ is an $R_2$ group as defined above minus the first $CH_2$ group, to form the reaction product $R_1.CH(CO.OR).CH(CO.OR).CO.R'_2$ which is then treated with sodium amalgam, hydrolysed and dehydrated to the desired alkyl-substituted anhydride.

Examples 1 to 6 below, in which the constitution of the lactonols concerned is defined by the groups $R_1$, $R_2$ and $R_3$ in the general formulae for these classes of substance given above, illustrate the preparation of lactonols according to the invention.

EXAMPLE 1

This example illustrates the preparation of certain 3,4-dimethyl-5-hydroxy-5-alkyl-2,5-dihydro - furane - 2 - ones in which the 5-alkyl group is an n-alkyl radical.

The starting materials used were 2,3-dimethyl-maleic anhydride and an n-alkyl magnesium bromide, the alkyl group being either ethyl, n-propyl or its higher homologues up to n-heptyl.

150 cc. of a solution of the n-alkyl magnesium bromide in ether, containing 0.15 mol. of the bromide and having a temperature of about 20° C. was added in 1½ hour to a solution of 0.13 mol. of 2,3-dimethyl-maleic anhydride in 150 cc. toluene kept at a temperature of —70° C. The solution was kept at this temperature for one hour, after which the reaction mixture was allowed to warm up to —10° C. At this temperature 100 cc. of a 20% aqueous solution of $NH_4Cl$ were added. Two layers were obtained, an aqueous layer, which was washed once with a small quantity of toluene, and a toluene layer, to which was added the forementioned small quantity of toluene used for washing the aqueous layer. This toluene fraction was dried over anhydrous sodium sulphate. After distilling off the solvent under vacuum (about 30 mm.) the crude lactonol thus obtained was fractionated under vacuum.

The characteristics of the pure lactonols are given in Table I below. In these compounds $R_1$ and $R_2$ are methyl groups and the $R_3$ groups are n-alkyl radicals of the formulae given in column 1 of the table.

*Table I*

LACTONOLS

| $R_3$ | B.P., °C./mm. | $n_D^{20}$ | U.V. max. in petr. ether, λ |
|---|---|---|---|
| $C_2H_5$ | 112/0.5 | | 213 |
| $C_3H_7$ | 114/0.2 | | 214 |
| $C_4H_9$ | 132/0.2 | 1.4734 | 214 |
| $C_5H_{11}$ | 134/0.2 | 1.4730 | 213 |
| $C_6H_{13}$ | 145/0.2 | 1.4719 | 211 |
| $C_7H_{15}$ | 155/0.2 | 1.4711 | 215 |

EXAMPLE 2

This example illustrates the preparation of 3,4-dimethyl-5-hydroxy-5-alkyl-2,5-dihydro-furane-2-ones in which the 5-alkyl group is a branched acyclic group or a cycloalkyl group.

The process was carried out as in Example 1 except that the starting materials used were 2,3-dimethyl-maleic anhydride and the appropriate Grignard reagent $R_3MgBr$ where $R_3$ was as specified below in Table II.

The characteristics of the pure lactonols are given in Table II below. In these compounds $R_1$ and $R_2$ are methyl groups and the $R_3$ groups are as defined in column 1 of the table.

*Table II*

LACTONOLS

| $R_3$ | B.P.,°C./mm. | M.P.,°C. | $n_D^{20}$ | U.V. max. in petr. ether, λ |
|---|---|---|---|---|
| $(CH_3)_2CH.CH_2.CH_2-$ | 120/0.2 | | 1.4721 | 213 |
| $(CH_3.CH_2)_2.CH-$ | | 69 | | 208 |
| $\overline{CH_2.(CH_2)_4.CH}-$ | | 158.5 | | 214 |
| $\overline{CH_2.(CH_2)_4.CH.CH_2}-$ | 140/0.06 | 67 | | 216 |

EXAMPLE 3

This example illustrates the preparation of 3,4-dimethyl-5-hydroxy-5-aralkyl-2,5-dihydro-furane-2-ones.

The process was carried out as in Example 1 except that the starting materials used were 2,3-dimethyl-maleic anhydride, phenylmethyl magnesium bromide and 2'-phenyl-ethyl magnesium bromide.

The characteristics of the pure lactonols are given in the Table III below. In these compounds $R_1$ and $R_2$ are methyl groups and the $R_3$ groups are as defined in column 1 of the table.

*Table III*

LACTONOLS

| $R_3$ | M.P.,°C. | U.V. max. in petr. ether, λ |
|---|---|---|
| $C_6H_5.CH_2.CH_2-$ | 92.5 | 216 |
| $C_6H_5.CH_2-$ | 76 | 217 |

EXAMPLE 4

This example illustrates the preparation of 3,4-diethyl-5-hydroxy-5-n-butyl-2,5-dihydro-furane-2-one, and certain homologues.

The process was carried out as in Example 1 except that the starting materials used were 2,3-diethyl-maleic anhydride and an n-alkyl magnesium bromide, the alkyl group being either n-butyl, n-pentyl or n-hexyl.

The characteristics of the pure lactonols are given in the Table IV below. $R_1$ and $R_2$ are ethyl groups and the $R_3$ groups are unbranched acyclic radicals as defined in column 1.

*Table IV*

LACTONOLS

| $R_3$ | B.P., °C./mm. | $n_D^{20}$ | U.V. max. in petr. ether, λ |
|---|---|---|---|
| $C_4H_9$ | 114–115/0.065 | 1.4722 | 210 |
| $C_5H_{11}$ | 114–115/0.065–0.0045 | 1.4720 | 218 |
| $C_6H_{13}$ | 123–124/0.061 | 1.4717 | 218 |

EXAMPLE 5

This example illustrates the preparation of a mixture of 3- and 4-methyl-5-hydroxy-5-n-pentyl-2,5-dihydro-furane-2-ones.

The process was carried out as in Example 1 except that the starting materials used were methyl-maleic anhydride and n-pentyl magnesium bromide.

The mixture of pure lactonols boiled at 126° C. under 0.22 mm., was of refractive index $n_D^{20}=1.4818$ and showed a U.V. maximum in petroleum ether at λ=211.

EXAMPLE 6

This example illustrates the preparation of 3,4-di-n-butyl-5-hydroxy-5-pentyl-2,5-dihydro-furane-2-one.

The process was carried out as in Example 1 except that the starting materials used were 2,3-dibutyl-maleic anhydride and n-pentyl magnesium bromide.

The lactonol boiled at 150–155° C. under 0.2 mm. and was of refractive index $n_D^{20}=1.4690$.

EXAMPLE 7

This example illustrates the preparation of the 3,4-dimethyl-5-n-alkyl-2,5-dihydro-furane-2-ones from 2,3-dimethylmaleic anhydride and the appropriate di(n-alkyl)-cadmium. The latter was prepared from the n-alkyl magnesium bromide as follows:

To 0.3 mol. of n-alkyl magnesium bromide 0.15 mol. of cadmium chloride was added while cooling. Subsequently the reaction mixture was refluxed until the alkyl magnesium bromide could no longer be detected. To this end the following, so-called Gilman checking test was carried out by mixing with 1–1.5 cc. of the reaction mixture an equal volume of 1% of Michler's ketone in dry benzene, after which 1 cc. of water and a few drops of a 2% iodine solution in glacial acetic were added. If alkyl magnesium bromide was present, a characteristic greenish-blue colour was observed.

As soon as the Gilman test gave negative results, 400 cc. of dry benzene was added to the reaction mixture which was then distilled until the issuing vapours had a temperature of 75° C. At that point another 400 cc. of benzene was added. The contents of the flask were brought to the boil (about 80° C.) and dimethyl maleic anhydride was slowly added with stirring. After the reaction the cadmium Grignard complex was hydrolysed with a 10% sulphuric acid solution. The aqueous layer was washed once more with benzene and the combined fractions were subsequently shaken three times with a 10% sodium carbonate solution and then with water, until no longer alkaline. (This purification is necessary to remove traces of anhydride.) After drying over anhydrous sodium sulphate and removal of solvent under a vacuum of 30 mm., the crude lactonol left behind was fractionated.

EXAMPLE 8

In this example 3,4-dimethyl-5-hydroxy-5-n-pentyl-2,5-dihydro-furane-2-one was made from dimethyl maleic anhydride and n-pentyl zinc chloride.

The process was carried out as in Example 1 but substituting for the Grignard reagent the corresponding proportion of n-pentyl zinc chloride, bringing the reagents together at room temperature and heating to 80° C. to effect the reaction.

The lactonols of the invention, besides being useful for the preparation of the corresponding lactones, also provide a new series of metal-sequestering agents.

We claim:
1. 3,4-dimethyl-5-cyclohexyl-5-hydroxy - 2,5 - dihydrofurane-2-one.
2. 3,4-dimethyl - 5 - cyclohexylmethyl-5-hydroxy-2,5-dihydro-furane-2-one.
3. A process for preparing a gamma-hydroxy alpha, beta-unsaturated gamma-lactone comprising reacting together a maleic anhydride of the formula

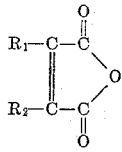

with an addition reagent selected from the group consisting of $R_3MgX$, $R_3ZnX$ and $R_3CdR_3$, the reaction being effected by bringing the reactants into contact, at a temperature from —95° C. to 5° C. when $R_3MgX$ is the addition reagent and at a temperature from 70° C. to 90° C. when $R_3ZnX$ and $R_3CdR_3$ are the addition reagents, in an inert solvent; hydrolyzing the resulting addition product to form thereby a gamma-hydroxy alpha, beta-unsaturated gamma-lactone of the formula

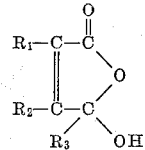

and recovering the gamma-hydroxy alpha,beta-unsaturated gamma-lactone by separating the resulting aqueous layer from the solvent layer, drying the solvent layer and removing the solvent from the gamma-hydroxy alpha, beta-unsaturated gamma-lactone; where $R_1$ and $R_2$ are radicals selected from the group consisting of hydrogen and unsubstituted alkyl having 1 to 5 carbon atoms, at least one of said $R_1$ and $R_2$ radicals being such alkyl; $R_3$ is a hydrocarbon radical selected from the group consisting of unsubstituted alkyl having 2 to 7 carbon atoms, unsubstituted alkylene having 4 carbon atoms, unsubstituted cycloalkyl having 6 carbon atoms, unsubstituted cycloalkylalkyl having 7 carbon atoms, unsubstituted aralkyl having 7 to 8 carbon atoms and unsubstituted aralkylene having 9 carbon atoms; and X is a halogen selected from the group consisting of chlorine and bromine.

References Cited in the file of this patent
UNITED STATES PATENTS
2,374,563   Reichel _____ Apr. 24, 1945

UNITED STATES PATENT OFFICE
CERTIFICATE OF CORRECTION

Patent No. 3,151,128                  September 29, 1964

Guido Lardelli et al.

It is hereby certified that error appears in the above numbered patent requiring correction and that the said Letters Patent should read as corrected below.

Column 2, line 22, for "$R_1C(OH)(CN).CHR_2).CO.OR$" read -- $R_1C(OH)(CN).CH(R_2).CO.OR$ --; line 26, for "$R(.CO.CH(R_2)Cl$" read -- $R_1.CO.CH(R_2)Cl$ --; same column 2, line 46, after "by" insert -- defining --.

Signed and sealed this 16th day of February 1965.

(SEAL)
Attest:

ERNEST W. SWIDER
Attesting Officer

EDWARD J. BRENNER
Commissioner of Patents